Jan. 2, 1934.  G. ZAPF  1,941,964
CARRYING ROPE
Filed Oct. 24, 1930
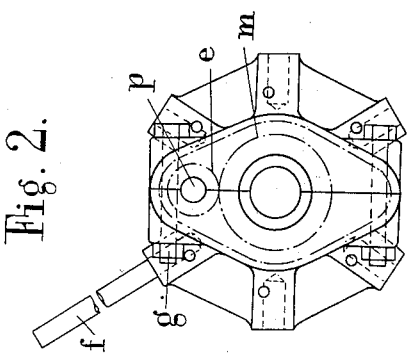
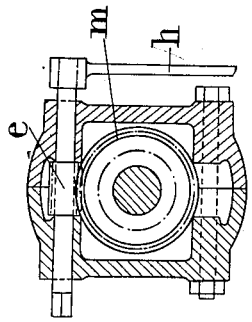
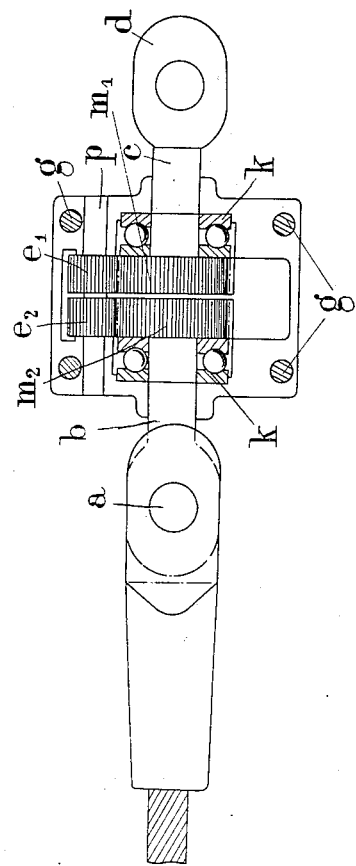
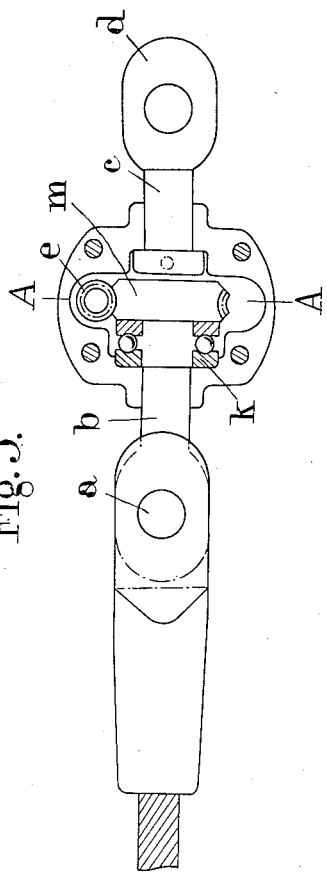

Patented Jan. 2, 1934

1,941,964

UNITED STATES PATENT OFFICE 1,941,964

CARRYING ROPE

Georg Zapf, Cologne, Germany, assignor to Felten & Guilleaume Carlswerk Actien-Gesellschaft, Cologne-Mulheim, Germany Application October 24, 1930, Serial No. 491,059, and in Germany October 28, 1929

6 Claims. (Cl. 104—112)

In the carrying ropes of cable ways, cable cranes and the like rope fractures occur mainly at that part of the surface of the rope, on which the supporting rollers of the crab run. This invention consists in means for ensuring uniform wear of the entire peripheral surface of the ropes. For this purpose the carrying ropes are rotatably supported at their ends so that they can be turned about their axis after being in operation for a certain time or after a certain number of journeys have been made by the crab, so as to expose a fresh portion of the surface of the rope to the rolling friction of the supporting rollers. By this means the life of the carrying ropes is increased, as a uniform wear for the whole periphery of the carrying ropes is ensured.

Two constructional examples of the turning devices according to the invention are shown in Figs. 1 to 4 of the accompanying drawing.

Fig. 1 shows a longitudinal section of one constructional form of the invention, Fig. 2 is an end view, Fig. 3 shows a longitudinal section of a second constructional form and Fig. 4 is a section on the line A—A of Fig. 3.

The ends of the carrying rope are connected, as shown in Fig. 1, to a head of the usual construction which is attached in a suitable manner, for instance by a pivot pin $a$, to a fixed spindle $b$. A second spindle $c$ is connected in a suitable manner, for instance by means of a pivotal head $d$, to the fixed suspension means or stretching device. The turning device is so constructed that the two heads can be turned with respect to one another by planet wheels $e$. With this arrangement of the sun and planet gear the carrying rope is turned by turning the casing, which causes the planet wheels $e_1$ and $e_2$, which are keyed on a shaft $p$ journalled at its ends in the casing and have different numbers of teeth, to roll around the periphery of the spur wheels $m_1$ and $m_2$. The spur wheel $m_1$ is connected to the means for fixing the carrying rope in such a manner that it cannot turn around its axis. This fixing in conjunction with the difference in the number of teeth of the planet wheels and consequently of the spur wheels results in the desired rotation of the spur wheel $m_2$ about its axis and consequently a turning of the rope.

Another constructional example of this turning device, shown in Fig. 3 comprises a worm with a worm wheel, the worm $e$ imparting a rotary motion to the worm wheel $m$ and consequently to the rope. For turning the worm a lever $h$, a hand wheel or a chain wheel may be used. For enabling this rotary motion to be produced under the high tension of the rope, the attaching heads of the crane hooks are journalled in strong ball bearings $k$.

If necessary, besides this rotary motion at both ends, which can of course also take place, the carrying rope must also be capable of being turned where it bears on the supports by similar means. Provision may be made by synchronizing devices of a kind known per se for causing the rope to be turned simultaneously at both ends and through the same angle. In the case of shorter carrying ropes the arrangement may be such that a single turning device is provided at one end only of the wire rope, while the other end is journalled so as to turn readily. When the rope is turned at one end, the other end will be also turned with it. The amount by which this end of the rope is turned may be rendered visible by an indicating device, for instance by a pointer fixed to the rope end. For preventing the carrying ropes from turning while in use, the turning devices may be provided with arresting means, if they are not self-locking.

What I claim is:

1. Means for increasing the life of carrying ropes, comprising in combination a member having a head for connecting it to the fixed suspension means or stretching device of the rope, a carrier on said member, a member having a head for connecting it to the rope, said second-mentioned member being rotatable on said carrier relatively to the first-mentioned member, and actuating means operatively connected to said second-mentioned member for turning the said member relatively to the first-mentioned member.

2. Means for increasing the life of carrying ropes, comprising in combination a casing having connecting means for connecting it to the fixed suspension means or stretching device of the rope, a spindle rotatably mounted in said casing and having means thereon for connecting the spindle to the carrying rope, so as to enable the rope to turn with the spindle on the latter being rotated, and actuating means operatively connected to said spindle for turning the spindle relatively to the casing.

3. Means for increasing the life of carrying ropes, comprising in combination a casing having a spindle having means thereon for connecting it to the fixed suspension means or stretching device of the rope, a second spindle rotatably mounted in said casing and having means thereon for connecting the spindle to the carrying rope, so as to enable the rope to turn with the spindle on the latter being rotated, and actuating means operatively connected to said second spindle for turning the spindle relatively to the casing.

4. Means for increasing the life of carrying ropes, comprising in combination a casing having a spindle having means thereon for connecting it to the fixed suspension means or stretching device of the rope, a second spindle rotatably mounted in said casing and having means thereon including a pivot pin, for connecting the spindle to the carrying rope, so as to enable the rope to turn with the spindle on the latter being rotated, and actuating means operatively connected to said second spindle for turning the spindle relatively to the casing.

5. Means for increasing the life of carrying ropes, comprising in combination a casing, a spindle rotatably mounted in said casing and having means thereon for connecting it to the fixed suspension means or stretching device of the rope, a second spindle rotatably mounted in said casing and having means thereon for connecting the spindle to the carrying rope, so as to enable the rope to turn with the spindle on the latter being rotated, and actuating means operatively connected to said second spindle for turning the spindle relatively to the casing, said actuating means comprising gear wheels fixed on said spindles and epicyclic pinions having a dissimilar number of teeth in engagement with said gear wheels and having a common shaft rotatably mounted in the casing so that on the casing being turned in the spindles, rotation of the second-mentioned spindle will take place with respect to the casing and the first mentioned spindle.

6. Means for increasing the life of carrying ropes, comprising in combination a casing having a spindle having means thereon for connecting it to the fixed suspension means or stretching device of the rope, a second spindle rotatably mounted in said casing and having means thereon for connecting the spindle to the carrying rope, so as to enable the rope to turn with the spindle on the latter being rotated, and actuating means operatively connected to said second spindle for turning the spindle relatively to the casing, said actuating means comprising a worm wheel fixed on the second mentioned spindle and a worm rotatably mounted in the casing and in engagement with said worm wheel.

G. ZAPF.